United States Patent
Montosi et al.

(10) Patent No.: US 8,224,530 B2
(45) Date of Patent: Jul. 17, 2012

(54) CAR STEERING SYSTEM

(75) Inventors: Davide Montosi, Fiorano Modenese (IT); Gianluigi Cavani, Caselvetro di Modena (IT); Amedeo Visconti, Turin (IT)

(73) Assignee: Ferrari S.p.A., Modena (IT)

( * ) Notice: Subject to any disclaimer, the term of this patent is extended or adjusted under 35 U.S.C. 154(b) by 620 days.

(21) Appl. No.: 12/227,820

(22) PCT Filed: May 30, 2007

(86) PCT No.: PCT/IB2007/001419
§ 371 (c)(1),
(2), (4) Date: May 26, 2009

(87) PCT Pub. No.: WO2007/138458
PCT Pub. Date: Dec. 6, 2007

(65) Prior Publication Data
US 2009/0299574 A1    Dec. 3, 2009

(30) Foreign Application Priority Data
May 31, 2006    (IT) .............................. BO2006A0424

(51) Int. Cl.
*B62D 5/04*    (2006.01)
*G06F 19/00*   (2006.01)

(52) U.S. Cl. ............ 701/42; 701/79; 180/443; 303/146

(58) Field of Classification Search ............. 701/42, 701/41, 45, 79; 180/443, 446, 412, 413; 303/146, 150, 148
See application file for complete search history.

(56) References Cited

U.S. PATENT DOCUMENTS

| | | | | |
|---|---|---|---|---|
| 5,904,223 | A * | 5/1999 | Shimizu et al. | 180/443 |
| 7,496,436 | B2 * | 2/2009 | Galkowski et al. | 701/41 |
| 2004/0148077 | A1 * | 7/2004 | Yasui et al. | 701/41 |
| 2006/0131957 | A1 * | 6/2006 | Kinder et al. | 303/191 |
| 2006/0175118 | A1 * | 8/2006 | Hirakushi et al. | 180/422 |
| 2007/0235240 | A1 * | 10/2007 | Lauer et al. | 180/204 |

FOREIGN PATENT DOCUMENTS
WO   WO 02/062647   8/2002

OTHER PUBLICATIONS
EP Appln. No. 07734711.0—Sep. 24, 2009 EPO Office Action.

\* cited by examiner

*Primary Examiner* — Tan Q Nguyen
(74) *Attorney, Agent, or Firm* — Davidson Berquist Jackson & Gowdey, LLP

(57) ABSTRACT

A steering system for a car having two front direction wheels and a number of electronic dynamic-performance control devices; the steering system has a steering wheel for controlling a turn angle of the front direction wheels, and a power-assist device which generates a power-assist torque which is added to the torque exerted on the steering wheel to vary the turn angle of the front direction wheels; the power-assist device has a control unit, which determines operation of the electronic dynamic-performance control devices, and modifies the power-assist torque as a function of operation of the electronic dynamic-performance control devices.

13 Claims, 2 Drawing Sheets

CAR STEERING SYSTEM

TECHNICAL FIELD

The present invention relates to a car steering system.

BACKGROUND ART

Most cars are now equipped with a power-assist or power steering device for reducing the torque exerted on the steering wheel to modify the turn angle of the front direction wheels.

The most widely used power-assist device is hydraulic, and comprises a hydraulic actuator, which generates a power-assist torque and is controlled by a number of valves activated by the angular position of the steering wheel.

The major drawback of power-assist devices of the above type lies in the power-assist torque being constant, and so tending to "overslacken" the steering wheel at high speed, so that the driver is unable to actually feel the dynamic performance of the car. To eliminate this drawback, it has been proposed to equip the power-assist device with a speed-sensitive valve, which gradually reduces the power-assist torque as speed increases.

Even a power-assist device with a speed-sensitive valve, however, does not allow the driver to accurately feel the dynamic performance of the car, especially when the car is equipped with electronic dynamic-performance control devices which greatly reduce the reactions of the car. For example, an ASR device prevents spinning of the drive wheels; an ABS (Anti Block System) and MSR device prevent the wheels locking when braking; an E-diff (electronic differential lock percentage control) device and an ESP (Electronic Stability Program) device limit swerving and excessive load transfer.

DE10245975A1 discloses a controlled planetary steering transmission with hydraulic rack assistance. The steering system comprises a hydraulic assistance computing unit controlling a valve 2 in response to signals including sensed input torque, and a steering wheel delivering the input torque to a portion of a steering column, from which rotation is transmitted via epicyclic gearing and a pinion to the rack.

DISCLOSURE OF THE INVENTION

It is an object of the present invention to provide a car steering system that is cheap and easy to produce, eliminates the aforementioned drawbacks, and, in particular, allows the driver to actually feel the dynamic performance of the car.

According to the present invention, there is provided a car steering system as claimed in the accompanying Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
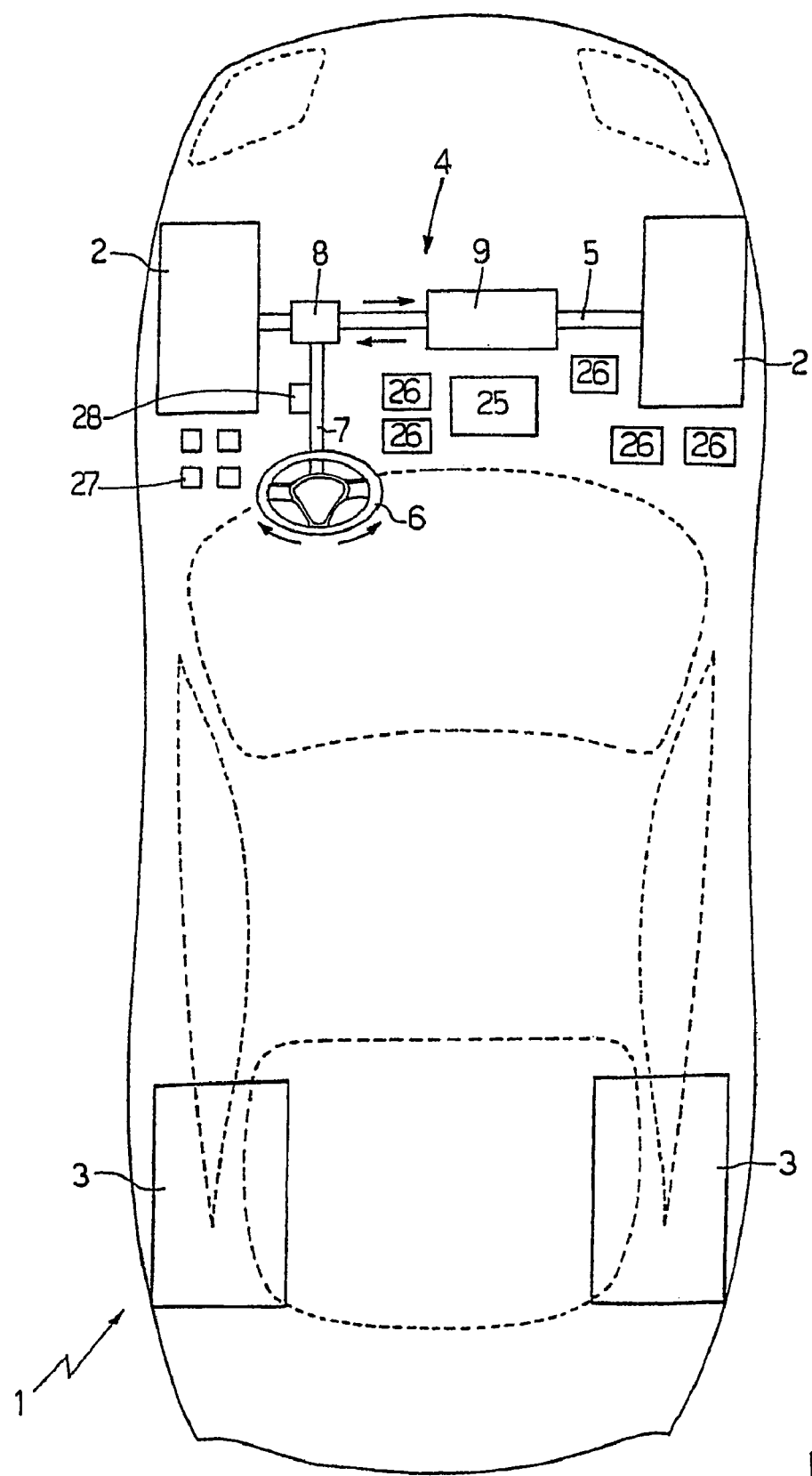
FIG. 1 shows a schematic of a car equipped with a steering system in accordance with the present invention.

Number 1 in FIG. 1 indicates a rear-drive car comprising two front direction wheels 2 and two rear drive wheels 3. The turn angle of front direction wheels 2 is controlled by a steering system 4 comprising a steering arm 5, which extends crosswise to car 1, is hinged at opposite ends to both front direction wheels 2, and is movable axially by a steering wheel 6. More specifically, steering wheel 6 is fitted to a rotary steering shaft 7 connected mechanically to steering arm 5 by a rack-and-pinion coupling device 8.

Steering system 4 also comprises a hydraulic power-assist (so-called "power steering") device 9, which generates a variable force on steering arm 5 to reduce (or, more generally speaking, modify) the torque exerted on steering wheel 6 to modify the turn angle of front direction wheels 2.

Figure 2:
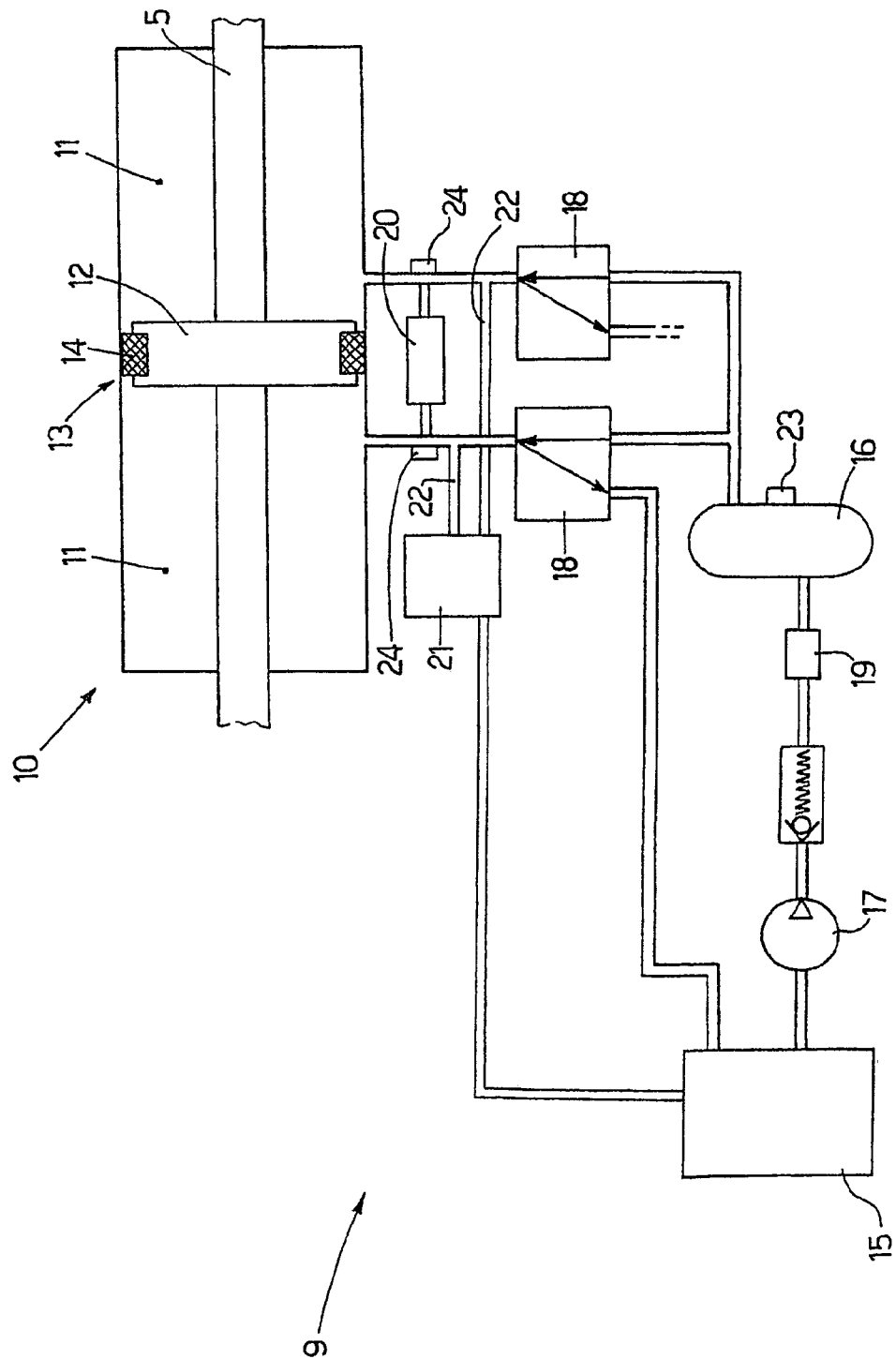
FIG. 2 shows a schematic of a hydraulic power-assist device of the FIG. 1 steering system.

As shown in FIG. 2, hydraulic power-assist device 9 comprises a hydraulic actuator 10 located at an intermediate portion of steering arm 5, and which comprises two chambers 11 filled alternately with a pressurized fluid to move steering arm 5 axially in both directions. More specifically, the two chambers 11 are fitted through with steering arm 5, are located in series along steering arm 5, and are separated by a flange 12, which is integral with steering arm 5, defines a piston of hydraulic actuator 10, and comprises a central annular cavity 13 housing an annular seal 14.

Hydraulic power-assist device 9 also comprises a storage tank 15 containing the control fluid (typically oil) of hydraulic actuator 10 at ambient pressure; a hydraulic accumulator 16 containing pressurized control fluid; a motor-driven pump 17, which draws control fluid from storage tank 15 and pumps pressurized control fluid to hydraulic accumulator 16; and two proportional solenoid valves 18 for selectively connecting chambers 11 of hydraulic actuator 10 to storage tank 15 and hydraulic accumulator 16. More specifically, each chamber 11 of hydraulic actuator 10 is associated with a respective three-way solenoid valve 18, which isolates chamber 11 to maintain a constant amount of control fluid inside chamber 11, connects chamber 11 to storage tank 15 to drain the control fluid from chamber 11, or connects chamber 11 to hydraulic accumulator 16 to feed control fluid into chamber 11.

Finally, hydraulic power-assist device 9 comprises a damp valve 20 located between the two chambers 11 to prevent any fluctuations in pressure (hammering); and a safety valve 21, which, in the event of a breakdown, connects both chambers 11 permanently to storage tank 15 by means of respective bypass conduits 22.

Hydraulic accumulator 16 is fitted with a pressure sensor 23 for determining the pressure of the fluid inside hydraulic accumulator 16; each chamber 11 is fitted with a pressure sensor 24 for determining the pressure of the fluid inside chamber 11; and pressure sensors 23 and 24 are connected to a control unit 25 for controlling power-assist device 9. More specifically, hydraulic actuator 10 is feedback-controlled by control unit 25 using the fluid pressures detected in chambers 11 by sensors 24 as feedback variables.

Car 1 is equipped with a number of electronic dynamic-performance control devices 26, which act on various active components (e.g. the engine and brakes) of car 1 to alter the dynamic performance of car 1. More specifically, electronic dynamic-performance control devices 26 comprise an ASR device for preventing spinning of rear drive wheels 3; an ABS (Anti Block System), which acts on the brake system to prevent locking of wheels 2 and 3 when braking; an MSR device, which acts on the drive torque to prevent rear drive wheels 3 from locking when braking; an E-diff (electronic differential lock percentage control) device, and an ESP (Electronic Stability Program) device, which limit swerving and excessive load transfer.

Control unit 25 is connected to electronic dynamic-performance control devices 26 (e.g. over a BUS of car 1) to real-time determine the status of electronic dynamic-performance control devices 26. In other words, control unit 25 is able to determine whether, and to what extent, an electronic dynamic-performance control device 26 is operating.

Control unit 25 is also connected to sensors 27 for real-time determining longitudinal speed Vx, longitudinal acceleration Ax, transverse (or lateral) acceleration Ay, and the swerve angle of car 1.

In a preferred embodiment, control unit 25 is also connected to a torque sensor 28 fitted to steering shaft 7 to determine the torque exerted by the user on steering wheel 6.

In actual use, control unit 25 determines operation of electronic dynamic-performance control devices 26, and modifies the power-assist torque accordingly.

When the ESP device indicates car 1 is close to its road-holding limit, control unit 25 may increase the power-assist torque to alert the driver accordingly in advance by increasing natural "slackening" of steering wheel 6 in advance. This control mode is better suited to non-professional drivers, whose main concern is safety, as opposed to pushing the car to its extreme limit. Conversely, when the ESP device indicates car 1 is close to its road-holding limit, control unit 25 may reduce the power-assist torque to counteract natural "slackening" of steering wheel 6. This control mode is better suited to professional drivers, whose main concern is pushing the car to its extreme limit, as opposed to safety.

On determining operation of the E-diff (electronic differential lock percentage control) device, control unit 25 may introduce into the power-assist torque a pulsating (i.e. time-variable) component of a frequency discernible by the driver (e.g. 1-5 Hz) and of low enough intensity (5-10% of the total) not to affect driving. The purpose of the pulsating component is to alert the driver to operation of the E-diff device, and to the fact that car 1 is nearing a limit, both of which, without the pulsating component, could go unnoticed by the driver (particularly a non-professional driver).

By means of sensors 27, control unit 25 also determines speed Vx, accelerations Ax and Ay, and the swerve angle of car 1, and modifies the power-assist torque accordingly.

Finally, by means of sensor 28, control unit 25 determines the torque exerted by the driver on steering wheel 6, and modifies the power-assist torque accordingly.

In other words, the final power-assist torque exerted on steering arm 5 depends on operation (if any) of electronic dynamic-performance control devices 26, on speed Vx, accelerations Ax and Ay, and the swerve angle of car 1, and on the torque exerted by the driver on steering wheel 6. In a preferred embodiment, the final power-assist torque exerted on steering arm 5 is largely determined (80-90%) on the basis of speed Vx of car 1, and is corrected slightly (10-20%) as a function of accelerations Ax and Ay of car 1, the swerve angle of car 1, operation (if any) of electronic dynamic-performance control devices 26, and the torque exerted by the driver on steering wheel 6.

As will be clear from the above description, hydraulic power-assist device 9 provides for "variable torque feedback" on steering wheel 6 of car 1. The variation in feedback is regulated by control unit 25 by means of hydraulic actuator 10, and is determined on the basis of the causes (e.g. ABS, MSR, E-diff, ESP intervention) and effects (speed, turn angle, accelerations, swerve angle) affecting dynamic performance of car 1.

The invention claimed is:

1. A steering system for a car having two front direction wheels and a plurality of electronic dynamic-performance control devices including an ESP device for controlling stability of the car; the steering system comprising:

a steering wheel for controlling a turn angle of the front direction wheels; and a power-assist device, which generates a power-assist torque which is added to the torque exerted on the steering wheel to vary the turn angle of the front direction wheels;

wherein the power-assist device comprises a control unit, which determines operation of the electronic dynamic-performance control devices, and modifies the power-assist torque as a function of operation of the electronic dynamic-performance control devices;

wherein the control unit comprises a first control mode for non-professional drivers whose main concern is safety as opposed to pushing the car to its extreme limit, in which, when the ESP device indicates the car is close to its road-holding limit, the control unit increases the power-assist torque to alert the driver accordingly in advance by increasing natural "slackening" of the steering wheel in advance; and wherein the control unit comprises a second a control mode for professional drivers whose main concern is pushing the car to its extreme limit, as opposed to safety, in which, when the ESP device indicates the car is close to its road-holding limit, the control unit reduces the power-assist torque to counteract natural "slackening" of the steering wheel.

2. The steering system as claimed in claim 1, wherein the electronic dynamic-performance control devices comprise an ASR device for preventing spinning of the drive wheels; an ABS device, which acts on the brake system to prevent locking of the wheels when braking; an MSR device, which acts on the drive torque to prevent the drive wheels from locking when braking; and an E-diff device for electronically controlling the lock percentage of a differential.

3. The steering system as claimed in claim 1, wherein the control unit is connected to the electronic dynamic-performance control devices over a BUS of the car to real-time determine the status of the electronic dynamic-performance control devices.

4. The steering system as claimed in claim 1, wherein, when the control unit determines operation of an E-diff device for electronically controlling the lock percentage of a differential, the control unit introduces into the power-assist torque a pulsating component at a frequency discernable by the driver and of low intensity.

5. The steering system as claimed in claim 1, wherein the control unit is connected to sensors for real-time determining the longitudinal speed Vx, longitudinal acceleration Ax, transverse acceleration Ay, and swerve angle of the car; the control unit determines the speed Vx, accelerations Ax and Ay, and swerve angle of the car by means of the sensors, and modifies the power-assist torque as a function of the speed Vx, accelerations Ax and Ay, and swerve angle of the car.

6. The steering system as claimed in claim 1, wherein the control unit is connected to a torque sensor connected to a steering shaft to determine the torque exerted by the driver on the steering wheel; the control unit determines the torque exerted by the driver on the steering wheel by means of the torque sensor, and modifies the power-assist torque as a function of the torque applied by the driver on the steering wheel.

7. The steering system as claimed in claim 1, wherein the power-assist device comprises a hydraulic actuator located at an intermediate portion of the steering arm, and which comprises two chambers filled alternately with a pressurized fluid to move the steering arm axially in different directions.

8. The steering system as claimed in claim 7, wherein the two chambers are operably engaged with the steering arm, are arranged in series along the steering arm, and are separated by a flange, which is integral with the steering arm and defines a piston of the hydraulic actuator.

9. The steering system as claimed in claim 8, wherein the power-assist device comprises a storage tank containing the control fluid of the hydraulic actuator at ambient pressure; a hydraulic accumulator containing pressurized control fluid; a motor-driven pump which draws control fluid from the storage tank and pumps pressurized control fluid to the hydraulic accumulator; and two proportional solenoid valves for selectively connecting the chambers of the hydraulic actuator to the storage tank and the hydraulic accumulator.

10. The steering system as claimed in claim 9, wherein the power-assist device comprises a damp valve located between the two chambers to prevent fluctuations in pressure.

11. The steering system as claimed in claim 9, wherein the power-assist device comprises a safety valve, which, in the event of a breakdown, connects the two chambers permanently to the storage tank by means of respective bypass conduits.

12. The steering system as claimed in claim 9, wherein the hydraulic accumulator is fitted with a first pressure sensor for determining the pressure of the fluid in the hydraulic accumulator; and each chamber is fitted with a second pressure sensor for determining the pressure of the fluid in the chamber.

13. The steering system as claimed in claim 12, wherein the control unit controls the power-assist device, and is connected to the second pressure sensors; and the hydraulic actuator is feedback-controlled by the control unit using the fluid pressures detected inside the chambers by the second pressure sensors as feedback variables.

* * * * *